(12) United States Patent
Martin

(10) Patent No.: US 10,821,828 B2
(45) Date of Patent: Nov. 3, 2020

(54) POWER TAKEOFF ASSEMBLY WITH GEAR TRANSFER AND PTO BRAKE

(71) Applicant: DirectDrive Plus, LLC, Honey Brook, PA (US)

(72) Inventor: Duane Martin, New Holland, PA (US)

(73) Assignee: DirectDrive Plus, LLC, Honey Brook, PA (US)

( * ) Notice: Subject to any disclaimer, the term of this patent is extended or adjusted under 35 U.S.C. 154(b) by 120 days.

(21) Appl. No.: 16/124,512

(22) Filed: Sep. 7, 2018

(65) Prior Publication Data

US 2019/0092165 A1  Mar. 28, 2019

Related U.S. Application Data

(60) Provisional application No. 62/564,410, filed on Sep. 28, 2017.

(51) Int. Cl.
| | |
|---|---|
| *B60K 17/28* | (2006.01) |
| *F16H 57/029* | (2012.01) |
| *F16D 55/02* | (2006.01) |
| *F16D 59/00* | (2006.01) |
| *F16D 59/02* | (2006.01) |
| *B60K 17/344* | (2006.01) |

(Continued)

(52) U.S. Cl.
CPC ............ *B60K 17/28* (2013.01); *B60K 17/344* (2013.01); *F16D 55/02* (2013.01); *F16D 59/00* (2013.01); *F16D 59/02* (2013.01); *F16H 57/029* (2013.01); *B60T 1/062* (2013.01); *F16D 2121/06* (2013.01)

(58) Field of Classification Search
CPC ...... B60K 17/28; B60K 17/344; B60K 25/06; F16D 55/02; F16D 59/00; F16D 59/02; F16D 2121/06; B60T 1/062; F16H 2057/02026; F16H 2057/02052; F16H 2057/0206; F16H 57/021; F16H 57/023; F16H 57/029; F16H 57/035
See application file for complete search history.

(56) References Cited

U.S. PATENT DOCUMENTS

| | | | | |
|---|---|---|---|---|
| 3,338,114 A | * | 8/1967 | Jacobson | B60K 25/06 |
| | | | | 74/665 F |
| 4,208,923 A | * | 6/1980 | Ikegami | B60K 17/28 |
| | | | | 74/15.63 |

(Continued)

FOREIGN PATENT DOCUMENTS

JP          01204823 A  *  8/1989

*Primary Examiner* — Laura Freedman
(74) *Attorney, Agent, or Firm* — Miller Law Group, PLLC

(57) ABSTRACT

A power takeoff mechanism utilizes intermeshing gears as a PTO power transfer mechanism to transfer rotational power from a power takeoff input shaft to an offset power takeoff output shaft. The PTO power transfer mechanism is supported in a fluid-tight housing mounted on the rearward side of the transfer case of a four wheel drive vehicle. A braking apparatus is operably connected to the drive gear and includes a piston, a biasing spring coupled with the piston and a pressure apparatus that keeps the spring from moving the piston until the drive has been disengaged from the power takeoff input shaft. The speed of operation of the PTO output shaft can be selectively varied by changing the ratio of the respective diameters of the drive gear and driven gear within the PTO power transfer mechanism.

15 Claims, 6 Drawing Sheets

(51) Int. Cl.
*F16D 121/06* (2012.01)
*B60T 1/06* (2006.01)

(56) References Cited

U.S. PATENT DOCUMENTS

| | | | | |
|---|---|---|---|---|
| 4,542,801 | A * | 9/1985 | Richards | B60K 17/28 180/235 |
| 4,579,183 | A * | 4/1986 | Irikura | B60K 17/105 180/307 |
| 5,267,477 | A * | 12/1993 | Irikura | B60K 17/00 180/53.1 |
| 6,237,708 | B1 * | 5/2001 | Kawada | B60K 17/28 180/53.7 |
| 6,830,142 | B2 * | 12/2004 | Weilant | B60K 17/02 180/247 |
| 6,957,991 | B2 * | 10/2005 | Gibbs | B60F 3/0007 440/12.51 |
| 7,325,635 | B2 * | 2/2008 | Yamaguchi | B60K 17/28 180/53.1 |
| 7,421,917 | B2 * | 9/2008 | Nishino | B60K 17/105 74/11 |
| 10,024,416 | B2 * | 7/2018 | Martin | B60K 17/344 |
| 10,272,774 | B2 * | 4/2019 | Hashimoto | B60K 5/02 |
| 2013/0213157 | A1 * | 8/2013 | Martin | B60K 17/344 74/15.82 |

* cited by examiner

POWER TAKEOFF ASSEMBLY WITH GEAR TRANSFER AND PTO BRAKE

CROSS-REFERENCE TO RELATED APPLICATIONS

This application claims domestic priority on U.S. Provisional Patent Application Ser. No. 62/564,410, filed on Sep. 28, 2017, the content of which is incorporated herein by reference.

FIELD OF THE INVENTION

The present invention relates generally to a power takeoff assembly for a four wheel drive vehicle, and more particularly, to a power takeoff shaft with a gear assembly supported on the vehicle transfer case to reverse the direction of rotation of the PTO output shaft as compared to the rotation of the PTO input shaft. The PTO gear assembly can also be provided with a braking apparatus to selectively stop the rotation of the PTO output shaft when the power takeoff assembly is disengaged.

BACKGROUND OF THE INVENTION

A transfer case is a part of a drive system for four wheel drive and all-wheel drive vehicles. The transfer case houses drive components that connect to the primary drive mechanism of the vehicle and transfers operative power to the front drive axle via a drive shaft associated with the drive components within the transfer case. Operative power is generally transferred from the primary drive mechanism to the drive components within the transfer case using a set of gears, a chain drive mechanism or a belt drive mechanism.

On some vehicles, including particularly commercial trucks and tractors, a power takeoff mechanism (PTO) is provided to transfer engine power to another piece of equipment or an accessory device carried by the vehicle. Typically, the power takeoff mechanism transfers engine power from the transmission to a secondary implement or accessory device by a power takeoff shaft. The power takeoff mechanism is operable independently of the transfer of engine power through the transfer case. Typically, manual drive transmissions have provisions for connecting the power takeoff mechanism lower on the transmission, in which case the power takeoff shaft is more easily able to pass below the transfer case to deliver engine power to the remote secondary or accessory device. Customarily, automatic transmissions provide operative connection of the power takeoff mechanism to the side of the transmission. As a result, power takeoff shafts are usually provided with universal joints to enable the power takeoff shaft to circumvent the transfer case to deliver operative power to the secondary implement or accessory device located behind the transfer case, as is depicted in FIG. 2 in broken lines.

As is described in detail in co-pending U.S. patent application Ser. No. 15/196,270, filed by Duane H. Martin on Jun. 29, 2016, the routing of the power takeoff shaft below the transfer case creates clearance problems, as the power takeoff mechanism often then become the lowest part of the drive mechanism. Furthermore, maintaining acceptable driveline angles within the universal joints can be problematic, as designing a power takeoff mechanism that will maximize ground clearance while minimizing the number of universal joints and the driveline angles required of the universal joints can prove to be difficult. Accordingly, the power takeoff mechanism can be passed through the transfer case without interfering with the transfer of power to the front wheel drive of the vehicle, which is disclosed and claimed in the aforementioned U.S. patent application Ser. No. 15/196,270.

Many four wheel drive vehicles power the power takeoff mechanism from the vehicle drive shaft, preferably upstream of the transmission, with a PTO assembly that causes the PTO input shaft to rotate in a direction that in a specific direction of rotation. However, some components that are desired to be driven by the power takeoff need to be driven in a different direction of rotation as the PTO input shaft. As a result, it is necessary in some manner to reverse the direction of rotation of the power takeoff mechanism for effective and proper operation of the driven component. In addition, some PTO driven components operate more effectively if the speed of rotation of the PTO output shaft was at a different ratio compared to the PTO input shaft. Furthermore, some PTO-driven components have an inherent amount of inertia that causes the PTO mechanism to continue rotating even after the power takeoff mechanism has been disengaged and made inoperative.

It would be desirable to provide a power takeoff mechanism for a four wheel drive vehicle passing through a transfer case with intermeshing gears that would provide for the operation of the PTO output shaft to be rotated in the reverse direction of rotation of the PTO input shaft. It would also be desirable to provide the ability to selectively change the speed of rotation of the PTO output shaft relative to the PTO input shaft, and for the power takeoff mechanism to incorporate a braking mechanism that would prevent the PTO shaft from coasting after the power takeoff mechanism has been disengaged, which would also have the benefit of helping the PTO output shaft to slow down after the power takeoff mechanism is disengaged.

SUMMARY OF THE INVENTION

It is an object of this invention to overcome the disadvantages of the prior art by providing a power takeoff mechanism that includes a power transfer apparatus mounted on the rear side of the power transfer case of a four wheel drive vehicle.

It is another object of this invention to provide a power takeoff mechanism that utilizes intermeshing gears to transfer rotational power between a power takeoff input shaft and a power takeoff output shaft.

It is a feature of this invention that the intermeshing drive and driven gears in the PTO power transfer mechanism are supported in a fluid-tight housing.

It is another feature of this invention that the fluid-tight housing is supported on the rearward exterior side of the transfer case for the front wheel drive apparatus powering the front wheels of the four wheel drive vehicle.

It is an advantage of this invention that the drive and driven gears can be directly engaged to provide a reverse direction of rotation of the power takeoff output shaft relative to the direction of rotation of the power takeoff input shaft.

It is still another object of this invention to provide a braking apparatus for a power takeoff mechanism.

It is still another feature of this invention that the braking apparatus can be operatively connected to the drive gear or output gear of the PTO power transfer mechanism.

It is another advantage of this invention that the rotation of the power takeoff mechanism can be halted with the disengagement of the drive mechanism powering the rotation of the power takeoff input shaft.

It is yet another feature of this invention that the braking apparatus can include a piston movable into engagement with the drive gear, a spring biasing the piston toward engagement with the drive gear and a pressure apparatus that keeps the spring retracted from exerting the biasing force on the piston.

It is still another advantage of this invention that the disengagement of the drive for the power takeoff mechanism results in the application of the braking apparatus to the drive gear.

It is still another advantage of this invention that the output speed of the PTO shaft can be selectively changed by changing the ration of the drive gear and driven gear within the PTO power transfer mechanism.

It is yet another advantage of this invention that the braking apparatus stops continued rotation of the power takeoff mechanism after power has been disengaged.

It is yet another object of this invention to provide a power takeoff mechanism that is durable in construction, inexpensive of manufacture, carefree of maintenance and simple and effective in use.

These and other objects, features and advantages are accomplished according to the instant invention by providing a power takeoff mechanism that utilizes intermeshing gears as a PTO power transfer mechanism to transfer rotational power from a power takeoff input shaft to an offset power takeoff output shaft. The PTO power transfer mechanism is supported in a fluid-tight housing mounted on the rearward side of the transfer case of a four wheel drive vehicle. A braking apparatus is operably connected to the drive gear and includes a piston, a biasing spring coupled with the piston and a pressure apparatus that keeps the spring from moving the piston until the drive has been disengaged from the power takeoff input shaft.

BRIEF DESCRIPTION OF THE DRAWINGS

The foregoing and other objects, features, and advantages of the invention will appear more fully hereinafter from a consideration of the detailed description that follows, in conjunction with the accompanying sheets of drawings. It is to be expressly understood, however, that the drawings are for illustrative purposes and are not to be construed as defining the limits of the invention.

DETAILED DESCRIPTION OF THE PREFERRED EMBODIMENT

Figure 1:
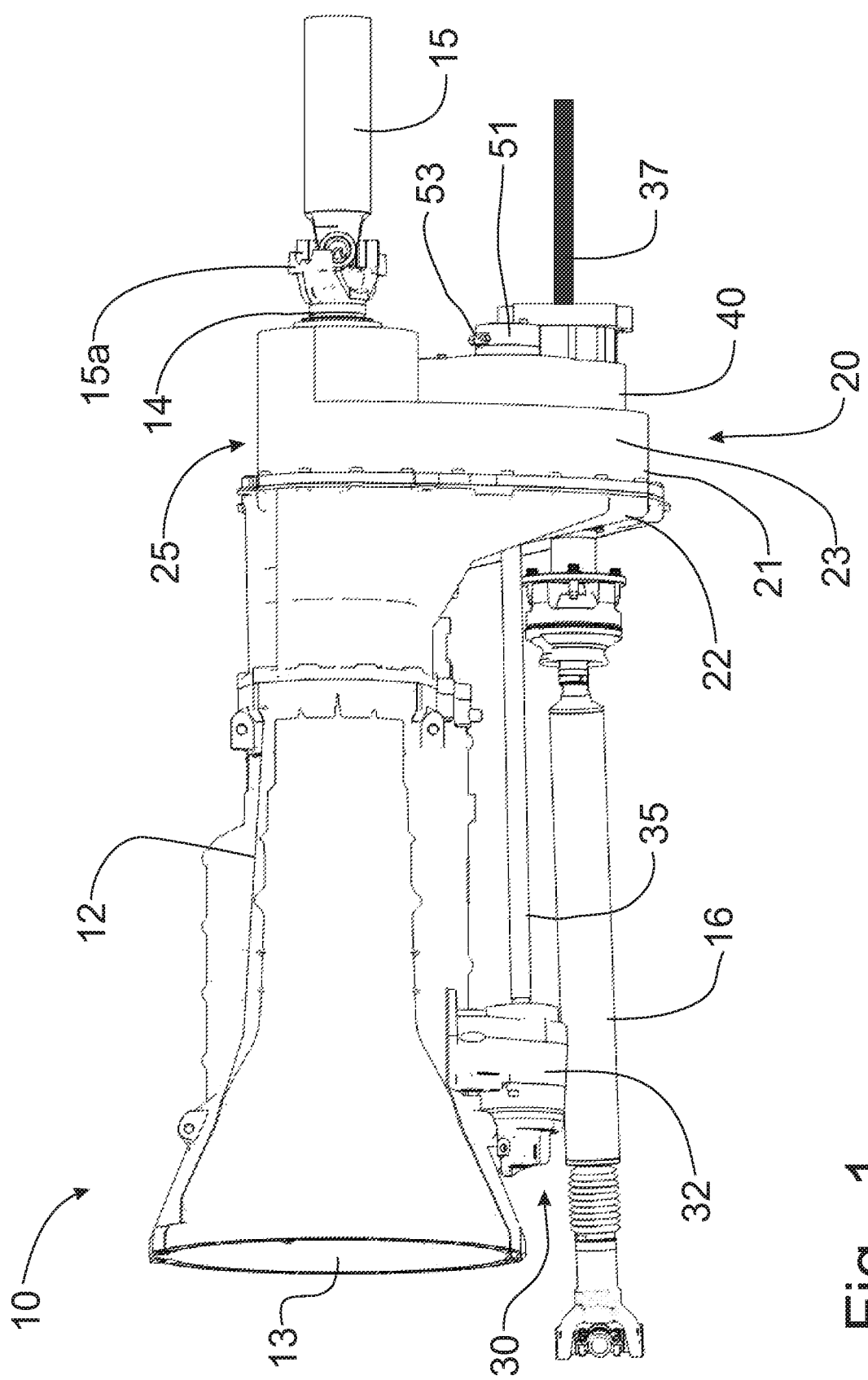
FIG. 1 is a top plan view of a portion of a drive mechanism for a four wheel drive vehicle utilizing a transfer case coupled to the primary drive mechanism and having a power takeoff mechanism incorporating the principles of the instant invention.
Figure 2:
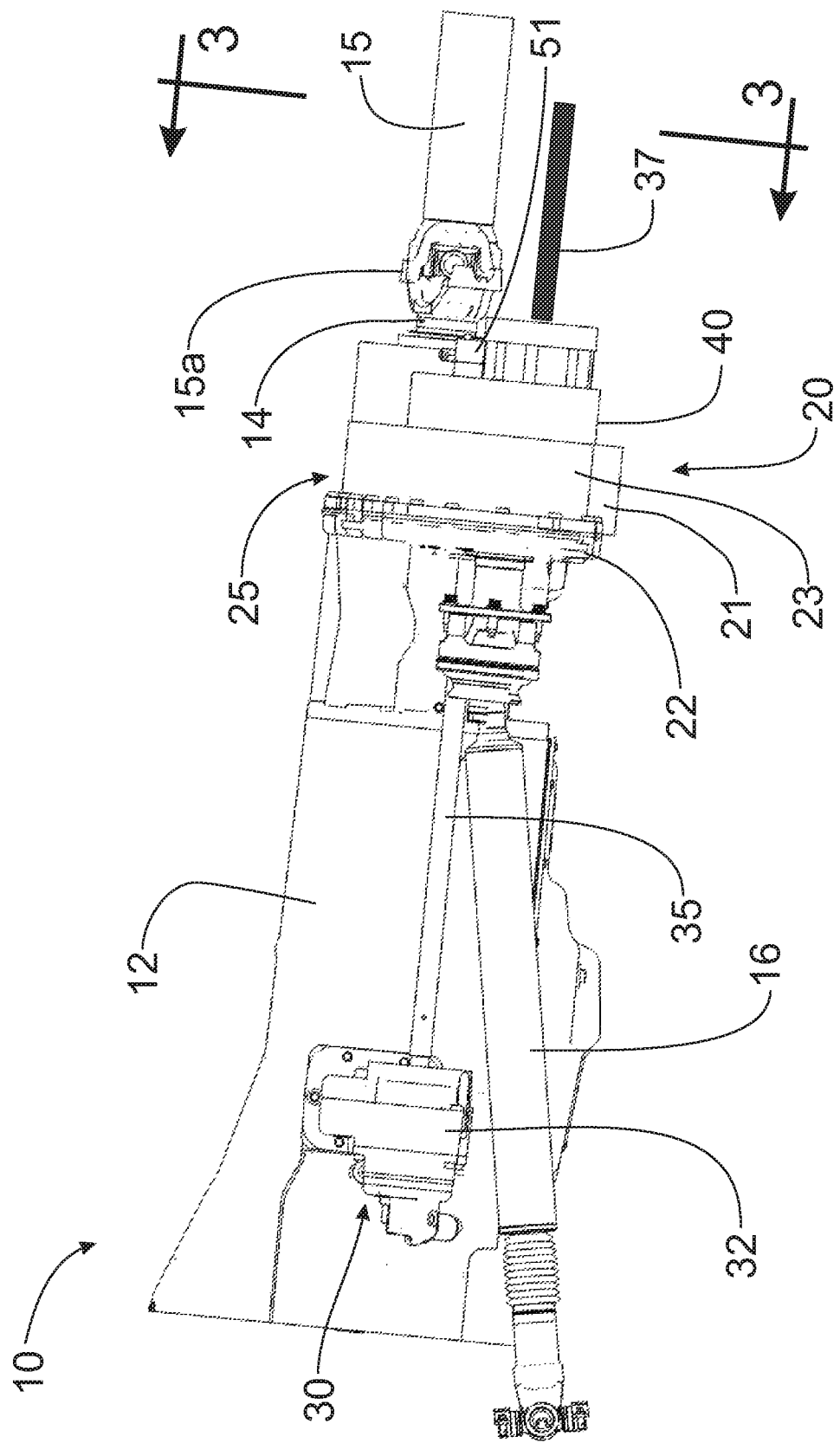
FIG. 2 is a side elevational view of the primary drive mechanism as shown in FIG. 1.
Figure 3:
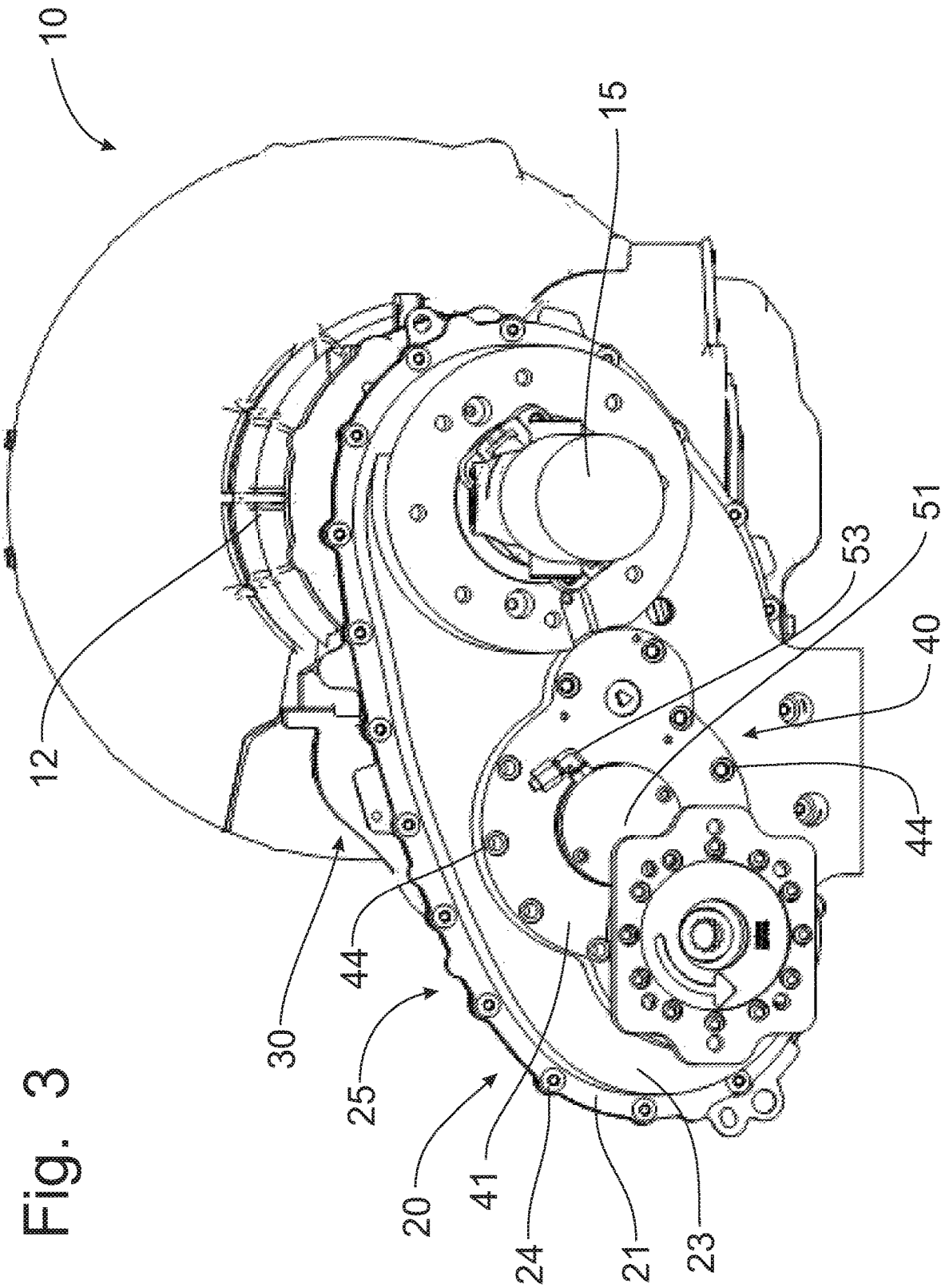
FIG. 3 is an enlarged rear elevational view of the transfer case corresponding to lines 3-3 of FIG. 2, the PTO output shaft being removed for purposes of clarity.

Referring to FIGS. 1-3, a significant portion of the primary drive line 10 for a four wheel drive vehicle can best be seen. The primary drive line 10 and the operation thereof to power the movement of a vehicle (not shown) is described in detail in Applicant's copending U.S. patent application Ser. No. 15/196,270, filed on Jun. 29, 2016, the content of which is incorporated herein by reference. Accordingly, the vehicle has a front axle and a rear axle which are both driven through the primary drive line 10 through operative connection with a conventional motor that provides a source of rotational power that is delivered to the transmission 12 by connection to the power input shaft 13 for the transmission 12. As one skilled in the art will recognize, the transmission 12 is operable to vary the speed of rotation of the transmission output shaft 14 with respect to the speed of operation of the transmission input shaft 13.

The rear axle of the vehicle is driven directly by connection to the transmission output shaft 14, which becomes the rear axle drive shaft 15 via connection through a universal joint 15*a*. The front axle of the vehicle is driven through a power transfer mechanism 25 associated with a transfer case 20 to transfer rotational power to a front axle drive shaft 16 which ultimately connects to the front axle typically through a clutch that permits selective operative engagement of the front axle drive shaft 16 with the front axle of the vehicle. Many four wheel drive vehicles, particularly commercial trucks and tractors, are also provided with a power takeoff mechanism 30 that is operable, as will also be described in greater detail below, to provide a source of operative power for a secondary implement or accessory device (not shown) that is associated with the vehicle.

The transfer case 20 includes a housing 21 that is generally oval in shape and is oriented perpendicularly to the drive line rearwardly of the transmission 12. The housing 21 is preferably manufactured from formed sheet metal or castings into mating front and rear housing members 22, 23 that are joined together by a plurality of fasteners 24 spaced around the periphery of the housing 21 with a seal (not shown) therebetween to form a fluid tight hollow housing 21 that retains lubricating fluid for the power transfer mechanism 25 housed within the housing 21.

The power transfer mechanism 25 within the transfer case 20 transfers rotational power to the front axle drive shaft 16, while the power takeoff 30 passes through the transfer case 20 in the manner defined in Applicant's copending U.S. patent application Ser. No. 15/196,270. One skilled in the art will recognize that the power transfer mechanism 25 could be in the form of a chain and sprocket mechanism, or intermeshing gears, or a belt drive to transfer rotational power to the front axle drive shaft 16.

The power takeoff mechanism 30 is operatively coupled to the front portion of the transmission 12 to be engaged with the transmission input shaft (not shown) so as to receive rotational power from the engine or motor (not shown) without modification of a fixed rotational speed as induced by the operation of the transmission 12 relative to the transmission input speed. One of ordinary skill in the art will recognize that the power takeoff mechanism (also known as the PTO) 30 receives rotational power from the input shaft 13 through a drive transfer mechanism 32 that causes the power takeoff shaft 35 to rotate. The PTO shaft 35 passes through the transfer case 20 and is connectable by a PTO output shaft 37 to a driven component (not shown) supported by the vehicle on the rearward side of the transfer case 20. Although the PTO shaft 35 passes through the transfer case 20, as is described in the aforementioned copending U.S. patent application Ser. No. 15/196,270, the PTO shaft does not engage or interfere with the power transfer mechanism 25 and the transfer case 20 remains a fluid-tight structure to keep the power transfer mechanism 25 therein lubricated.

A PTO transfer housing 40 is positioned on the rearward side of the transfer case 20. The PTO transfer housing 40 includes an exterior housing cover 41 that is attached to the rear side of the transfer case housing 21 by fasteners 44. In the preferred embodiment of this invention, as is described in greater detail below, the PTO transfer housing 40 is sealed against the rear side of the transfer case housing 21 to maintain a fluid tight environment for the mechanism within the PTO transfer housing 40. The fasteners 44 can be engaged with bosses 43 located on the exterior of the rear side of the transfer case housing 21 or engaged with bosses located on the interior of the rear side of the transfer case housing 21, in which case a seal between each cooperative pair of fastener 44 and interior boss would require a seal to maintain the fluid-tight integrity of the transfer case 20. Alternatively, the fasteners 44 can be simply connected to a rear cover 23 of the transfer case 20 that is configured to receive the fasteners without utilizing bosses.

Figure 4:
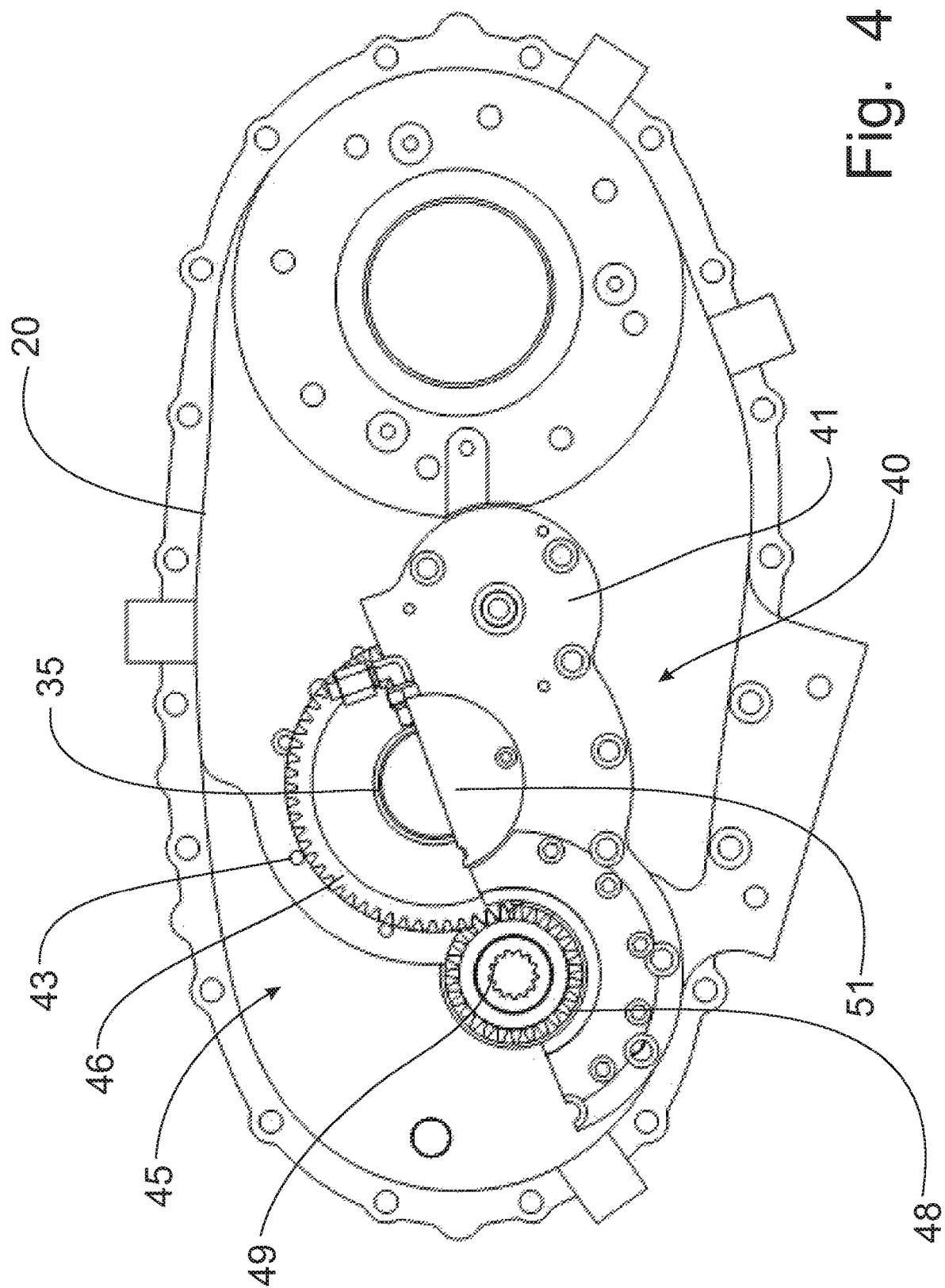
FIG. 4 is an enlarged rear elevational view of the transfer case with a portion of the rear covers broken away to view the intermeshing gear arrangement for the power takeoff assembly.
Figure 5:
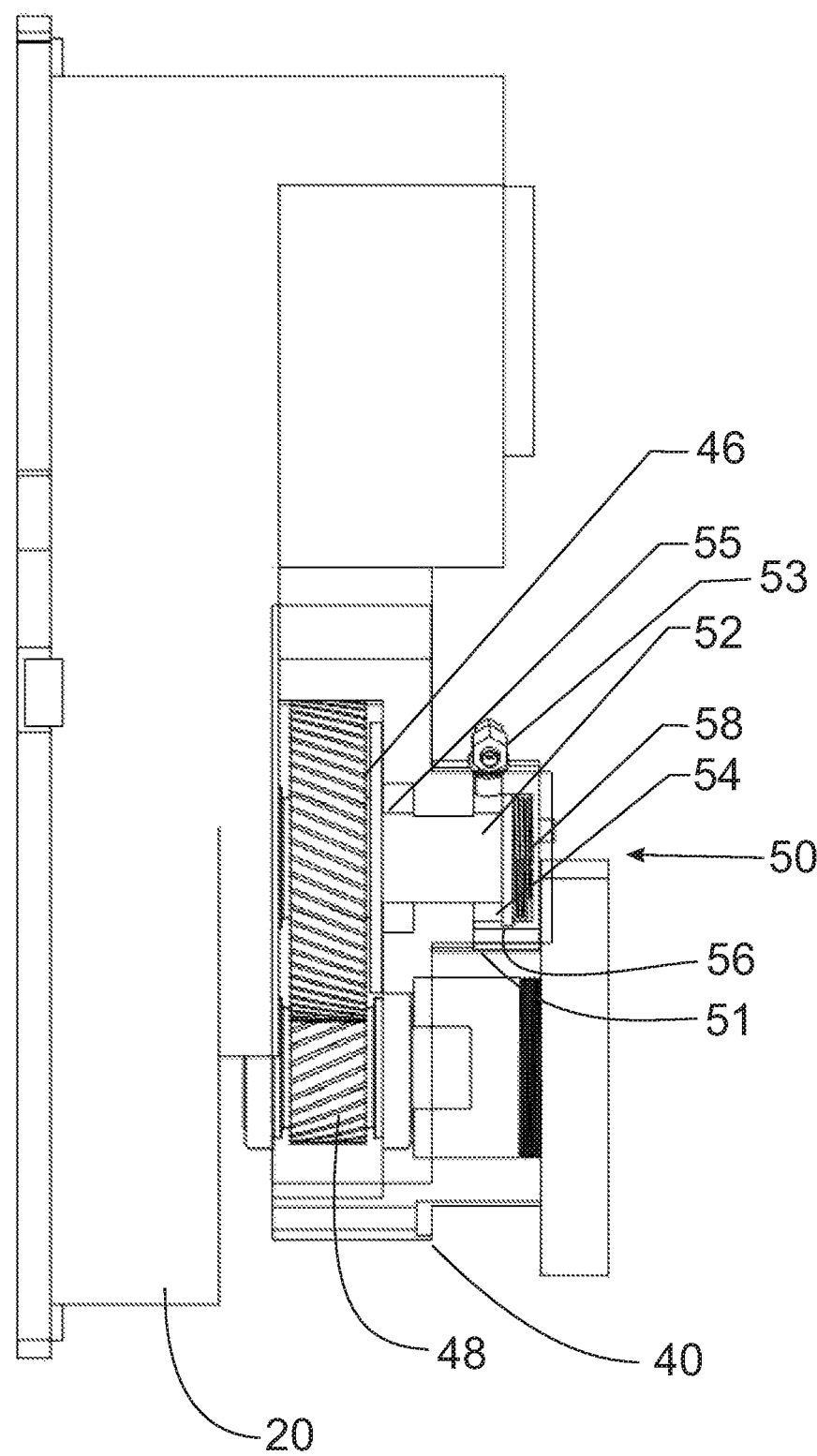
FIG. 5 is a top plan view of the transfer case with the cover for the power takeoff gear assembly being broken away to view the brake mechanism for the power takeoff assembly, the brake mechanism being in a retracted, inoperable position.

Referring now to FIGS. 3-5, the PTO power transfer mechanism 45 can best be seen. The power takeoff shaft 35 passes through the transfer case 20 and terminates on the rearward side of the transfer case housing 21 within the PTO transfer housing 40. A drive gear 46 is secured to the terminus of the PTO shaft 35 and is rotatable therewith within the PTO transfer housing 40. A driven gear 48 is rotatably supported by bearings from the rear side of the transfer case housing 21 and positioned to be in an intermeshing engagement with the drive gear 46. The driven gear 48 has an internal spline 49 that is adapted for receiving the splined end of the PTO output shaft 37 and causing rotation thereof to drive the connected component (not shown) supported by the vehicle.

One skilled in the art will understand that the PTO shaft 35 is typically driven through the PTO drive transfer mechanism 32 causing the power input shaft 13 of the primary drive mechanism 10 to rotate in a specific direction. The mounting of the drive gear 46 and the driven gear 48 enables the rotation of the PTO output shaft 37 to be in the opposition direction of rotation from the PTO input shaft 35. For power takeoff mechanisms 30 that operate in the opposing direction from the power input shaft 13, the above-described PTO power transfer mechanism 45 provides a convenient mechanism to drive the PTO output shaft 37 in the desired direction. The ratio of the speed of rotation of the PTO output shaft 37 as compared to the PTO shaft 35 can be varied to a desirable ratio by changing the respective diameters of the drive gear 46 and driven gear 48 placed within the PTO transfer housing 40. Accordingly, the speed of operation of the output of the PTO shaft 35 can be selectively established to any desired speed by changing the respective ratio of the drive gear 46 and the driven gear 48.

One skilled in the art will also recognize that the PTO transfer housing 40 could be mounted on the front side of the transfer case 20 with the intermeshing drive gear 46 and driven gear 48 mounted therein. In such a configuration, the power takeoff output shaft 37 would pass through the transfer case 20 instead of the power takeoff shaft 35. Also, one skilled in the art will further recognize that the respective operative components of the PTO transfer mechanism 45 would have to be arranged in a manner that the PTO output shaft 37 could pass through the transfer case 20 without interfering with the power transfer mechanism 25 within the transfer case 20.

Figure 6:
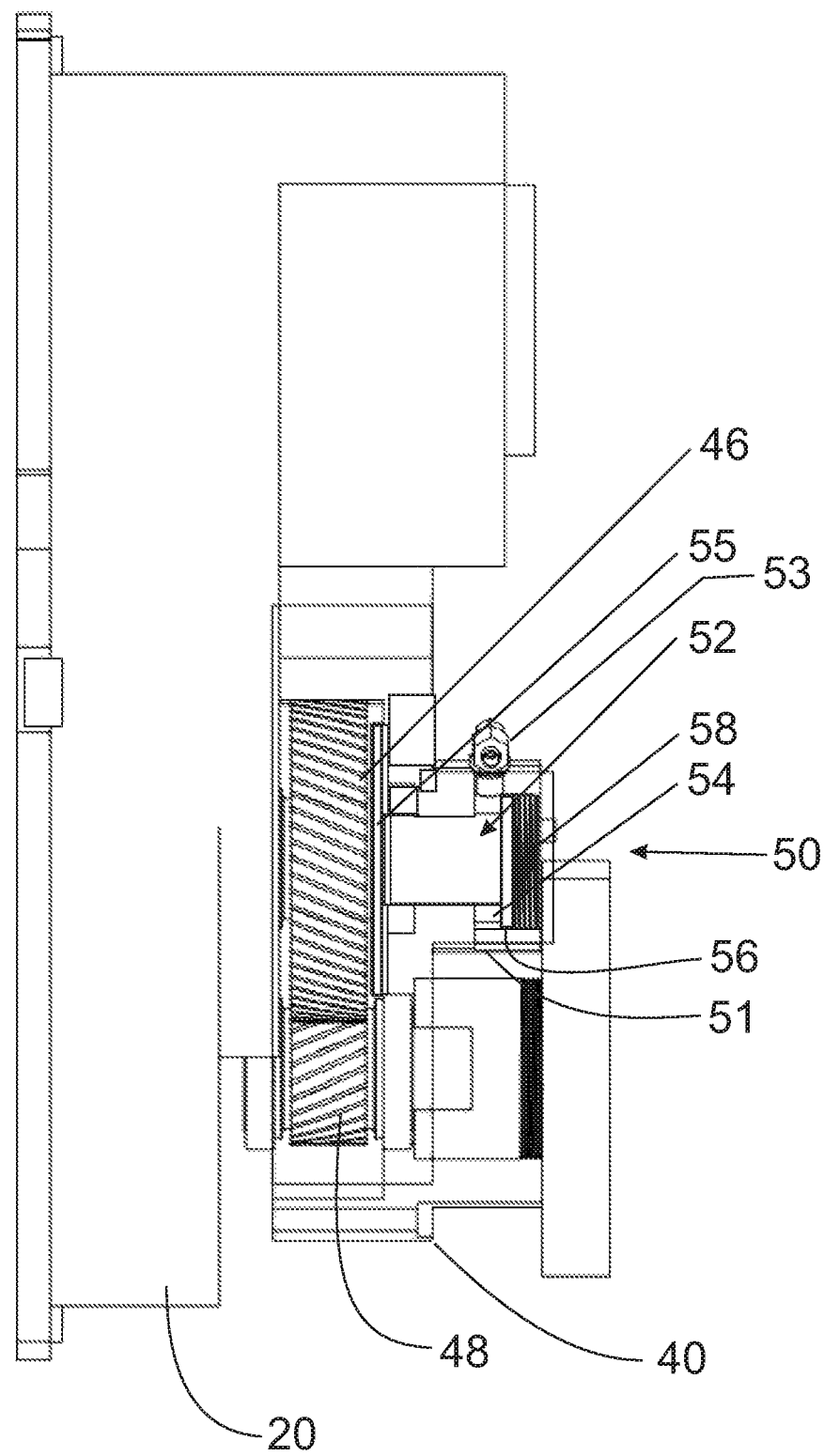
FIG. 6 is a top plan view of the transfer case as shown in FIG. 5, but with the brake mechanism engaged with the drive gear of the power takeoff assembly.

Referring now to FIGS. 5 and 6, a brake mechanism 50 cooperable with the PTO power transfer mechanism 45 can best be seen. The brake mechanism 50 includes a piston 52 that is supported within a brake housing 51 extending rearwardly from the PTO transfer housing 40 for linear reciprocal movement toward and away from the driven gear 46. The piston 52 has a brake shoe 55 mounted on the interior end thereof adjacent the drive gear 46, and an actuator head 56 on the exterior, distal end of the piston 52. A fluid-tight cavity 54 is formed within the brake housing 51 with a fluid connector 53 is in flow communication with the cavity 54 to provide a source of hydraulic fluid under pressure into the cavity 54. A compression spring 58 is captured between the actuator head 56 and the brake housing 51. The compression spring 58 exerts a biasing force on the actuator head 56, and therefore on the piston 52, to push the brake shoe 55 into engagement with the rearward faces of the drive gear 46.

By controlling the amount or pressure of the hydraulic fluid within the cavity 54 through the fluid connector 53, which fluid asserts a force against the actuator head 56 in opposition to the biasing force exerted by the compression spring 58, the positioning of the brake shoe 55 can be selectively controlled. Accordingly, the piston 52 is movable linearly toward and away from the drive gear 46 in response to the introduction or removal of the fluid within the cavity 54. When the pressure of the fluid within the cavity 54 is greater than the biasing force of the compression spring 58, the piston 52 and attached brake shoe 55 are shifted away from the drive gear 46, compressing the spring 58, thus allowing the drive gear 46 to rotate without interference. When the pressure of the fluid within the cavity 54 is less than the biasing force of the compression spring 58, the extension of the spring 58 pushes the piston 52 and attached brake shoe 55 into engagement with the rear face of the drive gear 46, causing the rotation of the drive gear 46 and all components operatively connected thereto to slow rotationally.

One skilled in the art will recognize that the above description of the brake mechanism 50 is a preferred embodiment, but that other alternative embodiments would be equally effective. For example, the brake mechanism 50 could be mounted on the driven gear 48 on the front side thereof substantially as described above for mounting on the drive gear 46, or on the rear side of the driven gear 48 by use of a hollow piston 52 that allows passage of the PTO output shaft 37 from the central internal splines 49 of the driven gear 48, and a hollow cavity 54. Similarly, the brake mechanism 50 could be mounted on the front side of the drive gear 46 to accommodate the passage of the PTO input shaft 35. Also, one skilled in the art will understand that the operational functions of the biasing force of the spring 58 and the pressure of the fluid within the cavity 54 could be reversed in that the spring 58 could be mounted to be operable to biased the brake shoe 55 away from engagement with the corresponding drive gear 46 or, alternatively, the driven gear 48, while the pressure of fluid induced into the cavity 54 would overcome the bias of the spring 58 to engage the brake mechanism 50 with the corresponding gear 46, 48.

The control of the introduction of hydraulic fluid through the fluid connector 53 into the cavity 54 can be manually accomplished, such as through a switch opening a valve to introduce or extract the hydraulic fluid. Preferably, however, the control of the fluid within the cavity 54 is automatically associated with the engagement of the PTO mechanism 30. Thus, when the PTO mechanism 30 is selectively engaged, fluid is automatically introduced into the cavity 54 at a pressure to overcome the biasing force of the compression spring 58 and allow the PTO mechanism 30 to run freely. Then, when the PTO mechanism 30 is selectively disengaged, the pressurization of the cavity 54 is removed, allowing the compression spring 58 to push the brake shoe into engagement with the drive gear 46. In the alternative embodiment described above where the spring 58 biases the brake mechanism 50 away from the corresponding gear 46, 48, the fluid could be introduced into the cavity 54 automatically when the power takeoff mechanism 30 is disengaged. Also as another alternative embodiment, the movement of the piston 52 could operate a wet clutch (not shown) that would selectively engage the drive gear 46 and stop rotation thereof.

The brake mechanism 50 when pressed into engagement with the drive gear 46 stops the PTO mechanism 30 from coasting, as some PTO mechanisms 30, especially when operatively connected to a component with significant inherent mass, will normally coast after disengagement. The utilization of the brake mechanism 50 would reduce or eliminate the coasting of such PTO mechanisms 30. In the embodiment of the brake mechanism 50 utilizing a brake shoe 55, one skilled in the art will recognize that any limited amount of dust created during the operation of the brake mechanism 50 could be removed from the PTO transfer housing 40 by removing the housing cover 41 and cleaning accordingly.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

For example, in the configuration noted above where the PTO power transfer mechanism 45 is mounted on the front side of the transfer case 20, the brake mechanism 50 could still be utilized in the same manner as described above, but oriented on the front of the drive gear 46 to move into engagement with the front face of the drive gear 46 to stop coasting of the PTO mechanism 30.

Another alternative embodiment of a power takeoff mechanism incorporating the principles of the instant invention would involve the placement of the PTO transfer gears 46, 48 within the transfer case 20. In such an alternative embodiment, the PTO transfer gears 46, 48 would be rotatably mounted inside the transfer case 20, rather than on the exterior of the transfer case 20. One skilled in the art will recognize that the drive gear 46 and the driven gear 48 would have to be located within the transfer case 20 in a position that would not interfere with the operation of the power transfer mechanism 25 to operatively drive the front wheel drive shaft 16. While placement of the drive and driven gears 46, 48 internally of the transfer case 20 restricts the convenience of changing gear ratios, the placement of the drive and driven gears 46, 48 internally of the transfer case allows these gears 46, 48 to share the lubrication within the transfer case 20 instead of providing a separate transfer housing 40 on the exterior of the transfer case 20. The brake mechanism 50 can still be incorporated into the power takeoff assembly 30, so long as the brake mechanism 50 does not interfere with the power transfer mechanism 25.

Having thus described the invention, what is claimed is:

1. In a power takeoff mechanism for a vehicle, said power takeoff mechanism being operably connected to a main drive line at a first location to provide selective rotation of a power takeoff shaft in a direction of rotation, said vehicle having a transfer case connected to said main drive line at a second location spaced from said first location and extending perpendicularly thereto to house a primary drive transfer mechanism providing rotational power to a front wheel drive mechanism, the improvement comprising:

said power takeoff mechanism originating externally of said transfer case and passing through said transfer case without engaging said primary drive transfer mechanism and being operably connected to a PTO power transfer mechanism supported on said transfer case to cause rotation of a power takeoff output shaft, such that said power takeoff mechanism is operable independently of said primary drive transfer mechanism, said PTO power transfer mechanism including a drive gear affixed to said power takeoff shaft and a driven gear connected to said power takeoff output shaft, both said drive gear and said driven gear being rotatably supported from an exterior surface of said transfer case; and a brake mechanism associated with one of said drive gear and said driven gear to engage said one of said drive gear and said driven gear when said power takeoff mechanism is disengaged to stop the drive gear from continuing to rotate.

2. The power takeoff mechanism of claim 1 wherein said drive gear and said driven gear intermesh to affect rotation of said power takeoff output shaft in a direction of rotation that is opposite to the direction of rotation of said power takeoff shaft.

3. The power takeoff mechanism of claim 1 further comprising a PTO transfer housing mounted on said transfer case, said drive gear and said driven gear being mounted in said PTO transfer housing.

4. The power takeoff mechanism of claim 3 wherein said PTO transfer housing is mounted on a rear side of said transfer case, said power takeoff shaft passing through said transfer case to position said drive gear within said PTO transfer housing mounted on said rear side of said transfer case.

5. The power takeoff mechanism of claim 1 wherein said brake mechanism comprises:

a piston linearly movable toward and away from said one of said drive gear and said driven gear;

a spring operably associated with said piston to assert a biasing force on said piston to urge linear movement of said piston; and a pressure apparatus for asserting fluid pressure on said piston in opposition to said biasing force asserted by said spring.

6. The power takeoff mechanism of claim 5 wherein said spring biases the movement of said piston toward said drive gear, said pressure apparatus engaging to oppose the biasing force of said spring in response to the engagement of operation of said power takeoff mechanism.

7. The power takeoff mechanism of claim 5 wherein said spring biases the movement of said piston away said drive gear, said pressure apparatus engaging to oppose the biasing force of said spring in response to the disengagement of operation of said power takeoff mechanism.

8. A power takeoff mechanism for a vehicle, said power takeoff mechanism being operably connected to a main drive line at a first location to provide selective rotation of a power takeoff input shaft in a first direction of rotation, said vehicle having a transfer case connected to said main drive line at a second location spaced from said first location and extending perpendicularly thereto to house a chain and sprocket primary drive transfer mechanism providing rotational power to a front wheel drive mechanism, comprising:
- a drive gear connected to said power takeoff input shaft for rotation therewith in said first direction of rotation, said power takeoff input shaft passing through said transfer case without engagement with said chain and sprocket primary drive transfer mechanism;
- a driven gear connected to a power takeoff output shaft; and
- a PTO transfer housing mounted on an exterior side of said transfer case, said drive gear and said driven gear being rotatably supported within said PTO transfer housing; and
- a brake mechanism associated with one of said drive gear and said driven gear to engage said one of said drive gear and said driven gear when said power takeoff mechanism is disengaged to stop the drive gear from continuing to rotate.

9. The power takeoff mechanism of claim 8 wherein said brake mechanism comprises:
- a piston linearly movable toward and away from said one of said drive gear and said driven gear;
- a spring operably associated with said piston to assert a biasing force on said piston to urge linear movement of said piston; and
- a pressure apparatus for asserting fluid pressure on said piston in opposition to said biasing force asserted by said spring.

10. The power takeoff mechanism of claim 9 wherein said drive gear and said driven gear intermesh to affect rotation of said power takeoff output shaft in a second direction of rotation that is opposite to the first direction of rotation of said power takeoff input shaft.

11. The power takeoff mechanism of claim 9 wherein said power takeoff input shaft passes through said transfer case to power the rotation of said drive gear within said PTO transfer housing mounted on a rearward side of said transfer case.

12. A power takeoff mechanism for a vehicle, said power takeoff mechanism being operably connected to a main drive line at a first location to provide selective rotation of a power takeoff input shaft in a first direction of rotation, said vehicle having a transfer case connected to said main drive line at a second location spaced from said first location and extending perpendicularly thereto to house a primary drive transfer mechanism providing rotational power to a front wheel drive mechanism, comprising:
- a drive gear connected to said power takeoff input shaft for rotation therewith in said first direction of rotation, said power takeoff input shaft passing through said transfer case without engagement with said primary drive transfer mechanism;
- a driven gear connected to a power takeoff output shaft;
- a PTO transfer housing mounted on a rearward side of said transfer case, said drive gear and said driven gear being rotatably supported within said PTO transfer housing; and
- a brake mechanism associated with said drive gear to engage said drive gear when said power takeoff mechanism is disengaged to stop the drive gear from continuing to rotate.

13. The power takeoff mechanism of claim 12 wherein said brake mechanism comprises:
- a piston linearly movable toward and away from said drive gear;
- a spring operably associated with said piston to assert a biasing force on said piston to urge linear movement of said piston; and
- a pressure apparatus for asserting fluid pressure on said piston in opposition to said biasing force asserted by said spring.

14. The power takeoff mechanism of claim 13 wherein said pressure apparatus releases said spring to apply said biasing force on said piston when said power takeoff mechanism is disengaged.

15. The power takeoff mechanism of claim 14 wherein said PTO transfer housing defines a fluid tight cavity within which said drive and driven gears are rotatably supported.

* * * * *